United States Patent [19]

Bechberger et al.

[11] Patent Number: 4,780,304

[45] Date of Patent: Oct. 25, 1988

[54] ACID INTRODUCTION IN CHLORINE DIOXIDE PRODUCTION

[75] Inventors: Edward J. Bechberger, Etobicoke; Colin R. McGregor, Oakville, both of Canada

[73] Assignee: Tenneco Canada Inc., Islington, Canada

[21] Appl. No.: 13,020

[22] Filed: Feb. 9, 1987

[51] Int. Cl.$^4$ ............................................. C01B 11/02
[52] U.S. Cl. ................................................... 423/478
[58] Field of Search ......................................... 423/478

[56] References Cited

U.S. PATENT DOCUMENTS

| | | | |
|---|---|---|---|
| 2,484,402 | 10/1949 | Day et al. | 423/478 |
| 2,641,528 | 6/1953 | Audoynaud | 423/478 |
| 3,816,077 | 6/1974 | Fuller et al. | 423/478 |
| 3,895,100 | 7/1975 | Cowley | 423/478 |
| 4,105,751 | 8/1978 | Caillol | 423/478 |
| 4,203,961 | 5/1980 | Cowley | 423/478 |
| 4,251,502 | 2/1981 | Forster | 423/478 |
| 4,486,399 | 12/1984 | Lobley | 423/478 |

Primary Examiner—Robert L. Stoll
Assistant Examiner—Adriana L. Mui
Attorney, Agent, or Firm—Sim & McBurney

[57] ABSTRACT

Chlorine dioxide is formed by reduction of sodium chlorate in a sulphuric acid-containing reaction medium. Sulphuric acid is introduced to the reaction medium in air atomized form to promote rapid and efficient mixing of the sulphuric acid, thereby avoiding chlorine dioxide decomposition at hot spots resulting from inefficient mixing of acid with the reaction medium.

11 Claims, No Drawings

ACID INTRODUCTION IN CHLORINE DIOXIDE PRODUCTION

FIELD OF INVENTION

The present invention relates to the production of chlorine dioxide.

BACKGROUND TO THE INVENTION

Chlorine dioxide is known to be produced continuously in a generator vessel by reduction of sodium chlorate in the presence of sulphuric acid in an aqueous reaction medium maintained at its boiling point under a subatmospheric pressure and from which by-product sodium sulphate deposits. The chlorine dioxide is removed from the generator in gaseous admixture with the stream.

A slurry of the deposited sodium sulphate and spent reaction medium is removed from the generator, the solid sodium sulphate is filtered out and the spent reaction medium is recycled to the generator, after the addition of make-up reactants.

The recycle line usually communicates with a sodium chlorate feed line upstream of a reheater, in which the recycle stream is reheated to the reaction temperature. As is described in U.S. Pat. No. 3,895,100, assigned to the assignee herein, the disclosure of which is incorporated herein by reference, a venturi pipe is included in the recycle line, the back pressure from which prevents boiling of recycle liquor in the reheater. Concentrated sulphuric acid is added to the throat of the venturi to be mixed with the recycle liquor. The mixture then is permitted to expand and enter the generator vessel.

All chlorate-based chlorine dioxide generating processes produce chlorine dioxide by the reaction:

$$ClO_3^- + Cl^- + 2H^+ \rightarrow ClO_2 + \tfrac{1}{2}Cl_2 + H_2O \tag{1}$$

with a competing reaction:

$$ClO_3^- + 5Cl^- + 6H^+ \rightarrow 3Cl_2 + 3H_2O \tag{2}$$

The extent to which equation (1) predominates over equation (2), i.e. the extent to which 1 mole of chlorate ion forms chlorine dioxide, is the efficiency of the process. The chloride ions employed in these reactions may be introduced from an external source and/or produced in situ by reduction of the by-product chlorine.

One commercial operation for the production of chlorine dioxide using a process of the above-described type is the so-called "R3" process developed by the assignee hereof, in which the chloride ions are provided by adding the same to the generator. One convenient measure of the efficiency for this type of chlorine dioxide-generating process, i.e. in which chloride ion reductant is fed from an external source, is the so-called Gram-Atom Percent or GA % efficiency. This measure of efficiency is based on a determination of the number of grams-atoms of chlorine in chlorine dioxide and in chlorine in the off-gas stream from the generator. The efficiency is determined by the relationship:

$$G.A. \% \; ClO_2 = \frac{\text{gram-atom of chlorine in chlorine dioxide}}{\text{gram-atoms of Cl in } ClO_2 + \text{gram-atom of Cl in } Cl_2}$$

As will be seen from the above equation (1), the GA % $ClO_2$ efficiency cannot exceed 50%.

It has been observed by the applicants for many years that the GA % efficiency of chlorine dioxide production in an R3 commercial plant was always less on a plant scale than could be attained in the laboratory. In addition, the chemical efficiency, i.e. the extent to which sodium chlorate reacts to form chlorine dioxide, was less than was expected, leading to higher-than-expected usage of sodium chlorate.

It has now surprisingly been found that the source of this problem is the decomposition of formed chlorine dioxide, mainly at the point of concentrated sulphuric acid addition. A number of subjective observations have been made by the assignee over the last 15 years or more of commercial operation of the R3 process which have led to this conclusion. In the early days of engineering the R3 process, a safe parameter for the number of concentrated sulphuric acid feed nozzles for the design capacity of chlorine dioxide generators was established. This parameter was arrived at based on the observation that at greater tons/day capacity per acid feed nozzle, crackling could be heard coming from the venturi, which was thought to be the result of chlorine dioxide decomposition. As the demand for larger production capacity generators grew, the requirement for the number of concentrated sulphuric acid entry nozzles based on the traditional formula became impractically large to pipe.

The original generator design had a radial entry for the recycle line (see U.S. Pat. No. 3,895,100 mentioned above). However, more modern generators use a tangential entry of the recycle line (see U.S. Pat. No. 4,203,961, assigned to the assignee herein), which permits increased production rates. However, as production rates increased, a decrease in efficiency was obtained. Direct observation of the vortex formed in the generator detected the incidence of "puffing" or spontaneous decomposition of the chlorine dioxide. The installation of vortex breakers in the slurry outlet from the generator solved this problem and the efficiency was restored to higher levels, although still below the expected level based on laboratory experience.

The observation of actual chlorine dioxide decompositions in the generator has lead to the conclusion that the less than expected efficiency in the plant results from decomposition of chlorine dioxide at the inlet of concentrated acid to the venturi. Concentrated sulphuric acid has a considerable heat of dilution, which may result in the development of local "hot spots", causing local decomposition of chlorine dioxide by the equation:

$$ClO_2 \rightarrow \tfrac{1}{2}Cl_2 + O_2$$

An extreme example of such decomposition is the crackling observed above, where the decompositions have become so numerous that they become audible.

The formation of such local "hot spots" results from incomplete and non-uniform mixing of the introduced acid and the recycled reactants. Once the source of this more than fifteen year old problem was recognized, the applicants sought solutions to the problem. If indeed the problem lay in incomplete mixing of the concentrated sulphuric acid, predilution of the acid should provide the sulphuric acid in a more compatible and dispersible form without a tendency for "hot spot" formation and decreased efficiency. Indeed, when 63% $H_2SO_4$ sulphuric acid was substituted for the concentrated (93 to 95 wt. % $H_2SO_4$) sulphuric acid, the efficiency of chlorine dioxide production increased to close to expected levels.

However, diluting the sulphuric acid in this way increases significantly the evaporative load on the generator and hence the energy requirements for the same production rate of chlorine dioxide and was considered undesirable.

SUMMARY OF THE INVENTION

In accordance with the present invention, these prior art problems are overcome by providing a concentrated sulphuric acid feed to the venturi of the chlorine dioxide generator in atomized form in an inert carrier gas, usually air. By atomizing the sulphuric acid and introducing the sulphuric acid in that form to the recycle stream, rapid, complete and uniform distribution of the sulphuric acid into the recycle stream is obtained.

By the utilization of air-atomized concentrated sulphuric acid, the improved efficiency observed by using dilute sulphuric acid is retained but without the problem of an increased evaporative level. By atomizing the sulphuric acid, the acid capacity of each of the acid introduction nozzles is substantially increased, typically up to three times, thereby enabling an increased chlorine dioxide production rate to be achieved, or the number of acid introduction nozzles may be decreased for the same generator capacity.

Not only, therefore, does the atomization of the concentrated sulphuric acid and introduction of the concentrated sulphuric acid in that form to the generator eliminate the chlorine dioxide decomposition problem but also simplifies engineering of higher capacity plants, since the number of acid introduction nozzles for a particular tons/day design capacity has been significantly decreased.

GENERAL DESCRIPTION OF INVENTION

The present invention is not restricted to the R3 chlorine dioxide generating process described above but rather is applicable to any chlorine dioxide generating process in which sulphuric acid is introduced to a chlorine dioxide-generating reaction medium. Other chlorine dioxide-generating processes to which the present invention is applicable include the assignee's R8 process, as described in U.S. Pat. No. 4,081,520, assigned to the assignee herein and the disclosure of which is incorporated herein by reference, wherein sodium chlorate is reacted with methanol and sulphuric acid. Other sulfuric acid-based conventional chlorine dioxide-generating processes to which the invention is applicable are the so-called R2, Mathieson and Solvay process.

The location of introduction of the atomized sulphuric acid to the reaction medium depends on the chlorine dioxide generation process and the configuration of the equipment. Usually, the introduction location is the same as the conventional location for the introduction of sulphuric acid to the particular chlorine dioxide-generating system.

The sulphuric acid is atomized using a convenient gas which is inert in the system. Air is the most convenient gas to employ, since air conventionally is bled into subatmospheric pressure operation chlorine dioxide generating processes to control the vacuum pressure. Any design of nozzle suitable for effecting atomization may be employed.

The preferred material construction of the acid nozzle is tantalum, which is considered a novel material of construction for acid introduction nozzles. Small inner parts of the nozzle may be constructed of pertetrafluoroethylene (TEFLON), or other acid resistant material, to effect economy. Materials conventionally used in strong acid environments suffer from various drawbacks overcome by the use of tantalum. For example, ceramic materials are prone to cracking and Teflon tends to wear in the abrasive environment of the recycle stream, although resistant to acid corrosion.

In order to achieve efficient and rapid mixing of the sulphuric acid with the reaction medium, the gas stream bearing the acid droplets should enter the recycle stream at a relatively high exit velocity, generally about 400 to about 800 ft/sec. To achieve the desired dispersion and mixing, the stream bearing the acid droplets should enter the recycle stream at as wide and flat an angle as is practical. Preferably, the acid droplet stream enters the recycle stream at an angle of less than about 30° to the axis of the recycle stream. Preferably, the acid droplet stream has a diameter which is about 1/16 to about $\frac{1}{2}$ of the diameter of the recycle stream.

Preferably the acid should be atomized to as high a degree as possible in the air stream prior to entry into the recycle stream. The volumetric ratio of air to acid after atomization should be at least about 30:1 and preferably at least about 60:1. The average droplet size of atomized acid may vary widely but preferably is less than about 500 microns using air at approximately 50 psig.

In this invention, therefore, concentrated sulphuric acid feed for chlorine dioxide generation is atomized in a carrier gas stream and introduced to the generator in this form, thereby achieving significant advantages over prior art operations using liquid concentrated sulphuric acid. The efficiency of chlorine dioxide production is increased while, at the same time, permitting a significant increase in production capacity for the same number of acid inlet nozzles.

Although the invention has been particularly described with reference to the use of concentrated sulphuric acid, i.e. a sulphuric acid solution containing greater than 90 wt. % $H_2SO_4$, preferably about 93 wt. % $H_2SO_4$, the invention may be employed with more dilute sulphuric acid, although, as noted above, more dilute sulphuric acid introduces the necessity to effect additional evaporation. Similarly, more concentrated sulphuric acid, such as oleum, may be employed, if desired, but is less preferred in view of its inherent handling problems.

EXAMPLE

A 12 ton/day, R3 process chlorine dioxide generator was operated using three different feeds of sulphuric acid, namely liquid 93% $H_2SO_4$, liquid 65% $H_2SO_4$ and air atomized 93% $H_2SO_4$, each at the same sulphuric acid flow rate of 1.5 USGPM. The results obtained were compared and appear in the following Table:

TABLE

| | 93% $H_2SO_4$ (Liquid) | 65% $H_2SO_4$ (Liquid) | 93% $H_2SO_4$ (Air Atomized) |
|---|---|---|---|
| Efficiency | 96 to 97% | 98 to 99% | 98 to 99% |
| Recirculation Rate (USGPM) | 2945 | 3461 | 2945 |
| Steam Requirement | 7000 | 8200 | 7000 |

TABLE-continued

| | 93% H$_2$SO$_4$ (Liquid) | 65% H$_2$SO$_4$ (Liquid) | 93% H$_2$SO$_4$ (Air Atomized) |
|---|---|---|---|
| (PPH) | | | |

As may be seen from the above Table, the diluted sulphuric acid increased the efficiency of the chlorine dioxide production which was maintained using air atomization. However, the use of dilute sulphuric acid increases the evaporative load on the generator, as can be seen from the significantly increased circulation rate and steam requirements.

SUMMARY OF DISCLOSURE

In summary of this disclosure, the present invention provides an improved procedure for introducing sulphuric acid to a chlorine dioxide-generating reaction medium by gas atomizing the concentrated sulphuric acid prior to introduction to the reaction medium, thereby enabling efficient mixing of the acid with the reaction medium and the minimization of loss of chlorine dioxide production by decomposition at the acid entry location. Modifications are possible within the scope of this invention.

What we claim is:

1. A continuous process for the production of chlorine dioxide, which comprises:
   continuously reducing sodium chlorate to chlorine dioxide in an aqueous acid reaction medium contained in a reaction zone and maintained at its boiling point under a subatmospheric pressure applied to the reaction zone,
   continuously removing a gaseous mixture comprising steam and chlorine dioxide from the reaction zone,
   continuously depositing a sodium sulphate from said reaction medium in said reaction zone,
   continuously removing a slurry of said deposited sodium sulphate in spent reaction medium from said reaction zone,
   continuously separating said sodium sulphate from said spent reaction medium and continuously recycling said spent reaction medium to said reaction zone,
   continuously adding aqueous sodium chlorate solution to said recycled spent reaction medium,
   heating said recycled spent reaction medium and added sodium chlorate solution to the reaction temperature while a back pressure is applied thereto to prevent boiling,
   accelerating the heated liquor to a maximum velocity,
   continuously adding concentrated sulphuric acid having a concentration of at least 90% H$_2$SO$_4$ in atomized form in an air stream to said accelerated heated liquor at said maximum velocity to promote rapid, complete and uniform distribution of said concentrated sulphuric acid in said accelerated heated liquor,
   continuously permitting the resulting chlorine dioxide generating mixture to expand and continuously forwarding the expanded mixture to the reaction zone.

2. The process of claim 1 further comprising the addition of reducing agent to said recycled spent reaction medium for the chlorine dioxide generating reaction, said reducing agent comprising methanol.

3. The process of claim 1 further comprising the addition of reducing agent to said recycled spent reaction medium for the chlorine dioxide generating reaction, said reducing agent comprising sodium chloride.

4. The process of claim 1 further comprising the addition of reducing agent to the recycled spent reaction medium for the chlorine dioxide generating reaction, said reducing agent comprising methanol and sodium chloride.

5. The process of claim 1 wherein said air stream has a flow rate of about 400 to about 800 ft/sec.

6. The process of claim 5 wherein said atomized sulphuric acid stream enters said recycled spent reaction medium at an angle of less than about 30° to the axis thereof.

7. The process of claim 6 wherein said atomized sulphuric acid stream has a diameter of about 1/16 to about ½ of the diameter of said recycled spent reaction medium.

8. The process of claim 7 wherein said sulphuric acid is atomized in said air stream to a volumetric ratio of air to acid of at least 30:1.

9. The process of claim 8 wherein said volumetric ratio is at least 60:1.

10. The process of claim 9 wherein said atomized acid has a droplet size of less than 500 microns.

11. The process of claim 1 wherein said concentrated sulphuric acid contains about 90 wt. % H$_2$SO$_4$.

* * * * *